(12) United States Patent
Briddell et al.

(10) Patent No.: US 6,754,242 B1
(45) Date of Patent: Jun. 22, 2004

(54) TDM FORMAT OPTIMIZED FOR MULTIPLE HIGH SPEED LINKS TO A COMMUNICATIONS CONTROLLER

(75) Inventors: Dennis Briddell, Cary, NC (US); Richard Kijewski, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 637 days.

(21) Appl. No.: 09/619,212

(22) Filed: Jul. 19, 2000

(51) Int. Cl.[7] .................................................. H04J 3/02
(52) U.S. Cl. ...................................... 370/539; 370/348
(58) Field of Search ............................. 370/400–401, 370/465–468, 252, 534–544, 328–337, 347–348; 709/238–240, 212

(56) References Cited

U.S. PATENT DOCUMENTS

| | | | |
|---|---|---|---|
| 5,020,058 A | | 5/1991 | Holden ........................ 370/109 |
| 5,274,635 A | | 12/1993 | Rahman .................. 370/601.1 |
| 5,515,371 A | * | 5/1996 | Venters ........................ 370/517 |
| 5,608,735 A | * | 3/1997 | McCullough et al. ........ 370/513 |
| 5,862,135 A | * | 1/1999 | Petty ........................... 370/376 |
| 5,991,817 A | * | 11/1999 | Rowett et al. .............. 709/250 |
| 5,999,529 A | * | 12/1999 | Bernstein et al. ........... 370/376 |
| 6,011,801 A | * | 1/2000 | Solomon ..................... 370/439 |
| 6,094,421 A | * | 7/2000 | Scott ........................... 370/280 |
| 6,269,103 B1 | * | 7/2001 | Laturell ....................... 370/458 |
| 6,366,583 B2 | * | 4/2002 | Rowett et al. .............. 370/401 |
| 6,449,655 B1 | * | 9/2002 | Hann et al. ................. 709/233 |
| 6,614,811 B1 | * | 9/2003 | Alaimo et al. .............. 370/498 |

* cited by examiner

Primary Examiner—Douglas Olms
Assistant Examiner—Van Nguyen
(74) Attorney, Agent, or Firm—Cesari and McKenna, LLP

(57) ABSTRACT

A highly interleaved Time Division Multiplexing (TDM) format allows for high data density transfer for a given port at a communications controller. The port is coupled to a Time Slot Assigner (TSA) that will steer the provisioned timeslots of the interleaved TDM data to appropriate Serial Communication Controllers (SCCs), both which are internal to the communications controller. Entries in a Serial Interface Random Access Memory (SI RAM) that is coupled to the TSA and a lookup memory in a clock gapping function block located at a TDM interleaving circuit, are programmed by the communication controller to facilitate the TSA in steering the timeslots.

39 Claims, 9 Drawing Sheets

TDM FORMAT OPTIMIZED FOR MULTIPLE HIGH SPEED LINKS TO A COMMUNICATIONS CONTROLLER

BACKGROUND OF THE INVENTION

1. Field of the Invention

The present invention relates to optimizing a communications controller and, in particular, to interleaving TDM format for multiple high speed links to a port of the communications controller.

2. Background Information

The advent of the telephone has had a great impact in the way people communicate. Instead of walking to the recipient of the message or waiting days for mail to arrive, one can simply pick up a phone and dial the other party. The phones are connected through a switching system and the communication boundaries are only limited by the extent of the system. Because communication is almost instantaneous, one can receive up-to-date news at the time of the conversation.

A new form of communication has emerged with the development of computer networking. Examples are Local Area Networking (LAN) and Wide Area Networking (WAN) such as the Internet. These networks accommodate a messaging system known as electronic mail (e-mail). Typically, a user connected to a network transmits e-mail by sending it to an e-mail server that services the e-mail recipient. On receipt, the e-mail server stores the e-mail in individual electronic mail-boxes until its recipient accesses the server. The server then makes available the e-mail for his disposal. Like a telephone call, e-mail is also transmitted almost instantaneously among the various users; however, an additional advantage is that in the case of a long distance call, the use of e-mail provides substantial savings over the long distance toll charges.

There has been a drive to provide integrated voice/data services such as Voice over Frame relay (VoFR), Voice over Asynchronous Transfer Mode (VoATM) and Voice over Internet Protocol (VoIP). For instance, the Internet allows for voice, video and data to be transmitted through its network and it is a matter of developing hardware and software to convert voice into a format suitable for transmission. The resulting benefit is that telephone calls and faxes can be made through a computer coupled to the Internet. As an example, suppose an office has a contract with an Internet Service Provider (ISP) and is connected to it via a leased line. The office may then transmit telephone calls and faxes via the Internet without requiring additional services from the telephone company.

A router installed at the ISP or at the user's end having voice/data integration capabilities provides for voice/data networking, opening a door to WAN voice/data/fax multi-servicing and Internet telephony markets. In instances where information is transmitted via a T1/E1 carrier, the receiving router needs to process the information carried by the carrier. To accommodate this, communication controllers within the router interface with the T1/E1 carriers.

An example of an interface suitable for such use is the MPC860 communications controller, available from Motorola. Details of the MPC860 may be found in a technical manual titled "MPC860 PowerQUICC User's Manual" available from Motorola.

The MPC860 is an integrated communications controller having a plurality of serial communication controllers (SCCs) to control the serial data transfer that is interfaced to the MPC 860. An SCC includes a transmit (Tx) buffer and a receive (Rx) buffer coupled to a Tx Direct Memory Access (DMA) controller and a Rx DMA respectively, for transfer of data to and from the main memory that is coupled to the MPC860. The MPC860 includes a Time-Slot Assigner (TSA) with two serial ports that interface with the serial data transmitted to the MPC860, and it steers the serial data to the respective SCCs. As is typical with communication controllers, the MPC860 is limited to one high speed link per serial port (or maximum of two high speed links) due to relatively small buffering capabilities of the Tx and the Rx buffers. The MPC860 may operate in Non-Multiplexed Serial Interface (NMSI) mode. As the name implies, the serial interface is not multiplexed and hence, the SCCs have fixed assignments to the NMSI interfaces on the device (MPC860). One of the disadvantages in this mode of operation is that it is not possible to support multiple data links, i.e. channelized T1/E1 service over T1/E1 trunk. The result is only fractional T1/E1 service can be supported in this mode.

Alternatively, the MPC860 may operate in a Time Division Multiplexing (TDM) mode. The TDM mode enables multiplexing of multiple high speed links onto one serial port. In this instance, the MPC860 does not limit the association of the TDM data with any particular SCCs; the SCCs may be assigned to any part of the serial TDM stream, without any dependencies to each other. However, the use of TDM mode is not problem free. The next obvious step would be to employ an external time switching device to merge the multiple TDM sources into a single rate adapted stream, whose speed is the sum of the sources. The resulting stream would terminate at the serial TDM port of the communications controller. This approach may work if the combined stream does not have an excessively high clock speed. However, as speeds increase with the number of links combined, the shallow SCC buffers begin to show problems in the form of transmit (Tx) underruns and receive (Rx) overflows. An overflow is a situation in which the Rx DMA is unable to empty the Rx buffer faster than it is being filled. Conversely, an underrun is a situation in which the Tx DMA is unable to fill the Tx buffer faster than it is being emptied. This is due to the fact that the several DMAs are competing for the same local bus and the main memory resources. This undermines the performance of the MPC860 and as well as the network, because packet corruptions are handled at higher layers in the communications protocol stack and great effort is required for a recovery. Furthermore, the TSA operates according to the entries stored in the Serial Interface Random Access Memory (SI RAM) which contains SCC routing information in the TDM mode. However, the number of entries in the SI RAM are limited. For instance, each entry may represent route information for one timeslot and the SI RAM may not have sufficient entries to address all the timeslots in the multiplexed high speed link.

SUMMARY OF THE INVENTION

In accordance with the invention, a TDM interleaving circuit, such as a TDM bus controller, interleaves multiple TDM data links to form a high data density interleaved TDM stream at a port of a communications controller. The interleaved TDM format maximizes the data transfer to a Time Slot Assigner (TSA), internal to the communications controller to which the port is coupled. The TSA includes a Serial Interface Random Access Memory (SI RAM), wherein its entries contain routing information to steer the interleaved TDM data stream to pertinent Serial Communications Controllers (SCCs) also internal to the communication controller. Typically, the interleaved TDM format is rather complex and the decoding capabilities of the TSA is rather limited. To simplify the decoding process, a clock gapping function is provided that "gaps" the clock for all timeslots (or data bits) that are not provisioned or merely used for signaling/framing.

The communications controller configures the clock gapping function block and the SI RAM so that they both operate synchronously. The communication controller programs the clock gapping function block so that portions of the interleaved TDM data stream that are not provisioned are appropriately clock gapped. Whether certain portions of the TDM data stream are provisioned or non-provisioned may be obtained extrinsically by the communication controller, for instance, via network device administrator input. Further, the communication controller programs the SI RAM with entries that contain routing information corresponding to the clock gapped TDM data stream so that the TSA is able to correctly steer the TDM data stream to the appropriate SCCs. Using the gapped clock, the TSA is able to determine the time sequence in which to access the entries in the SI RAM.

BRIEF DESCRIPTION OF THE DRAWINGS

The invention description below refers to the accompanying drawings, of which.

DETAILED DESCRIPTION OF AN ILLUSTRATIVE EMBODIMENT

In a communications system, it is not practical to provide every user with a line, thus, various multiplexing schemes are used to allow multiple users to transmit multiple conversations through a single line. The two commonly used multiplexing schemes are frequency division multiplexing (FDM) and time division multiplexing (TDM). In FDM, a line's bandwidth is divided into several frequency bands and a user is allocated one of these frequency bands during a conversation. In other words, each user is separated in frequency. In TDM, a line's time spectrum is divided into several channels (or timeslots) and a user is allocated a timeslot during a conversation. In other words, each user is separated in time.

Figure 1A:
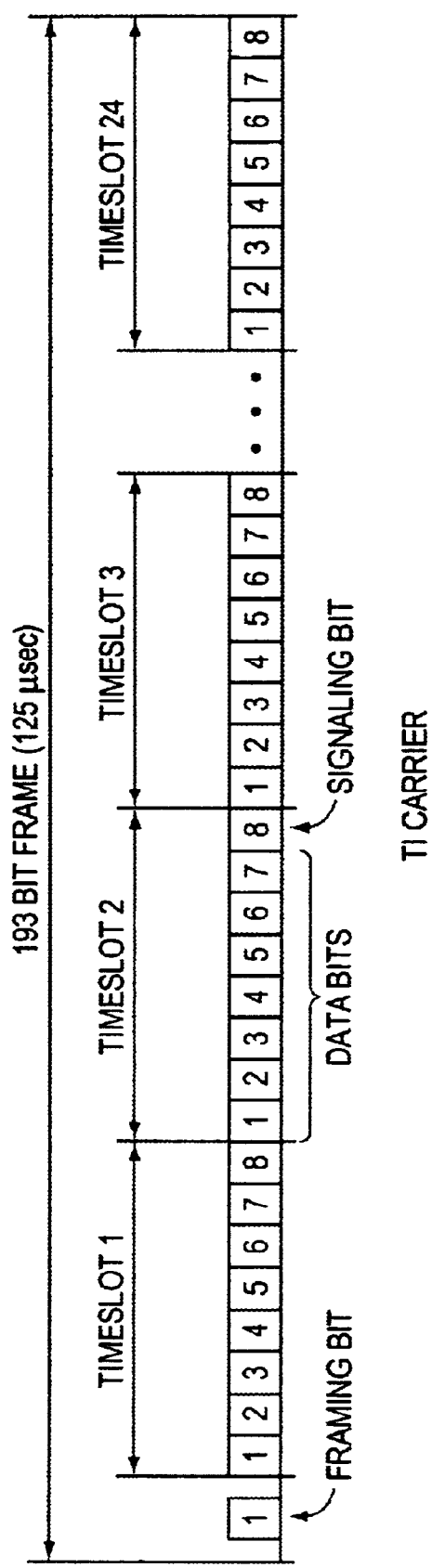
FIG. 1a is a schematic diagram of a T1 carrier.

The advantage of TDM is that it is easily handled by digital electronics on which modem communication systems are based. In North America and Japan, the widely used TDM carrier is the T1 carrier, which is shown in FIG. 1a. The T1 carrier comprises 24 timeslots multiplexed together. Each timeslot comprises 8 bits and occurs at 8000 times per second (or 125 usec period). Of the 8 bits, 7 bits are for data and 1 bit is for control (call signaling uses the Least Significant Bit (LSB) of each timeslot), thus, the T1 carrier yields 7×8000=56 Kbps of data. A frame comprises 24×8=192 bits and 1 bit for framing to yield 193 bits for every 125 usec. This gives a gross data rate of 1.544 Mbps.

Another type of carrier that is widely used in countries other than North America and Japan is the E1 carrier. This carrier comprises of 32 timeslots of eight bits in a frame of 125 usec. 30 of the timeslots are used for data and 2 timeslots are used for signaling. Each group of 4 frames provides 64 signaling bits, half of which are used for timeslot associated signaling and the other half of which are used for frame synchronization or are reserved for usage by the individual countries. An E1 carrier gives a gross data rate of 2.048 Mbps.

Figure 2:
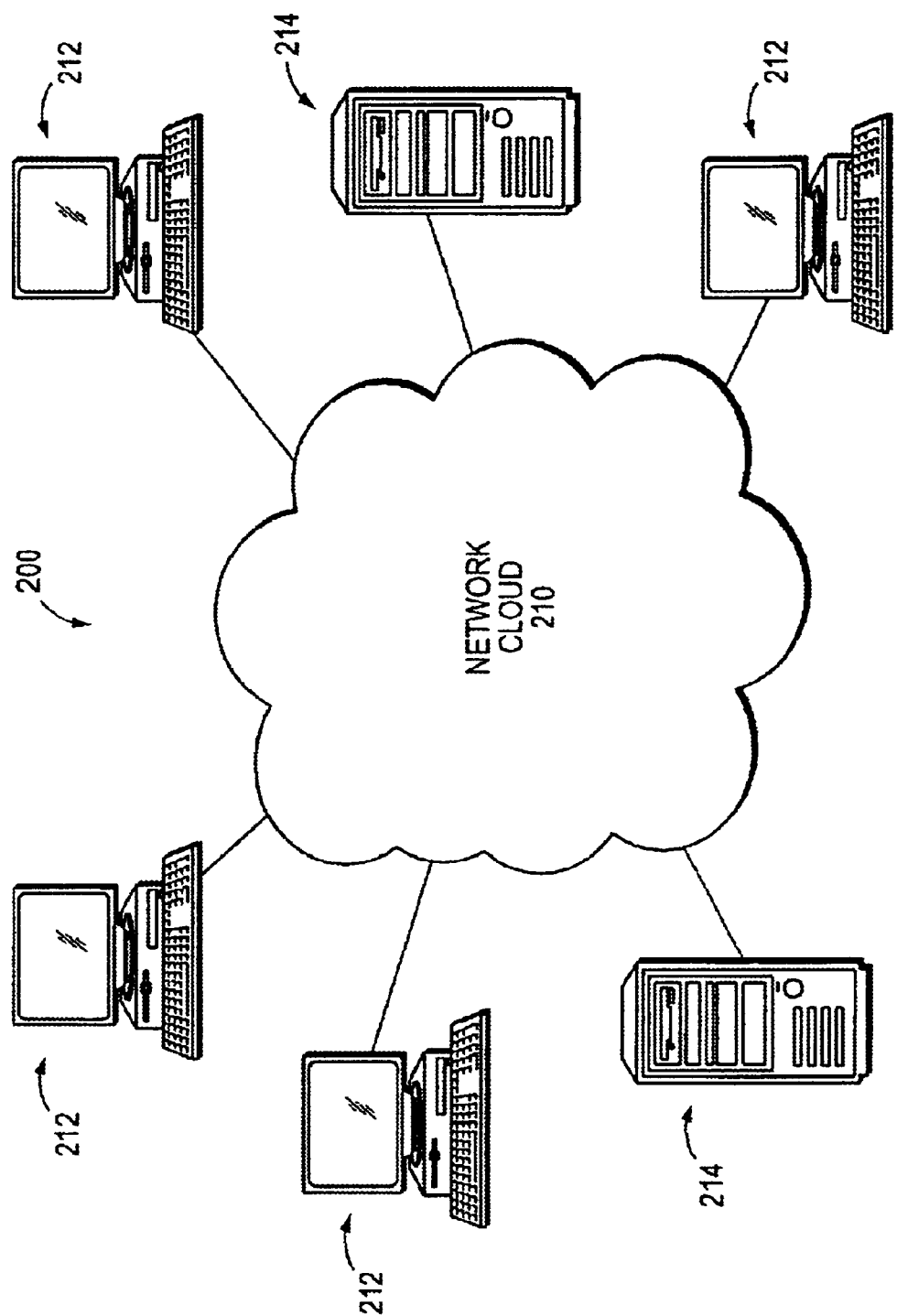
FIG. 2 illustrates a network in which an embodiment of the invention may be implemented.

FIG. 2 is a schematic diagram of a network 200 that includes a network cloud 210 comprising transmission lines, backbones, switches, routers and repeaters, dependent on the extent of the network, and that allows various devices connected to the network to communicate with each other. These various devices may include simple computers such as personal computers (PCs) and workstations 212, that transmit or receive data, or they may be sophisticated resource servers 214 that store various resources. For instance, the Internet is a giant web that connects large numbers of these simple computers and resource servers together for the interchange of information.

Figure 3:
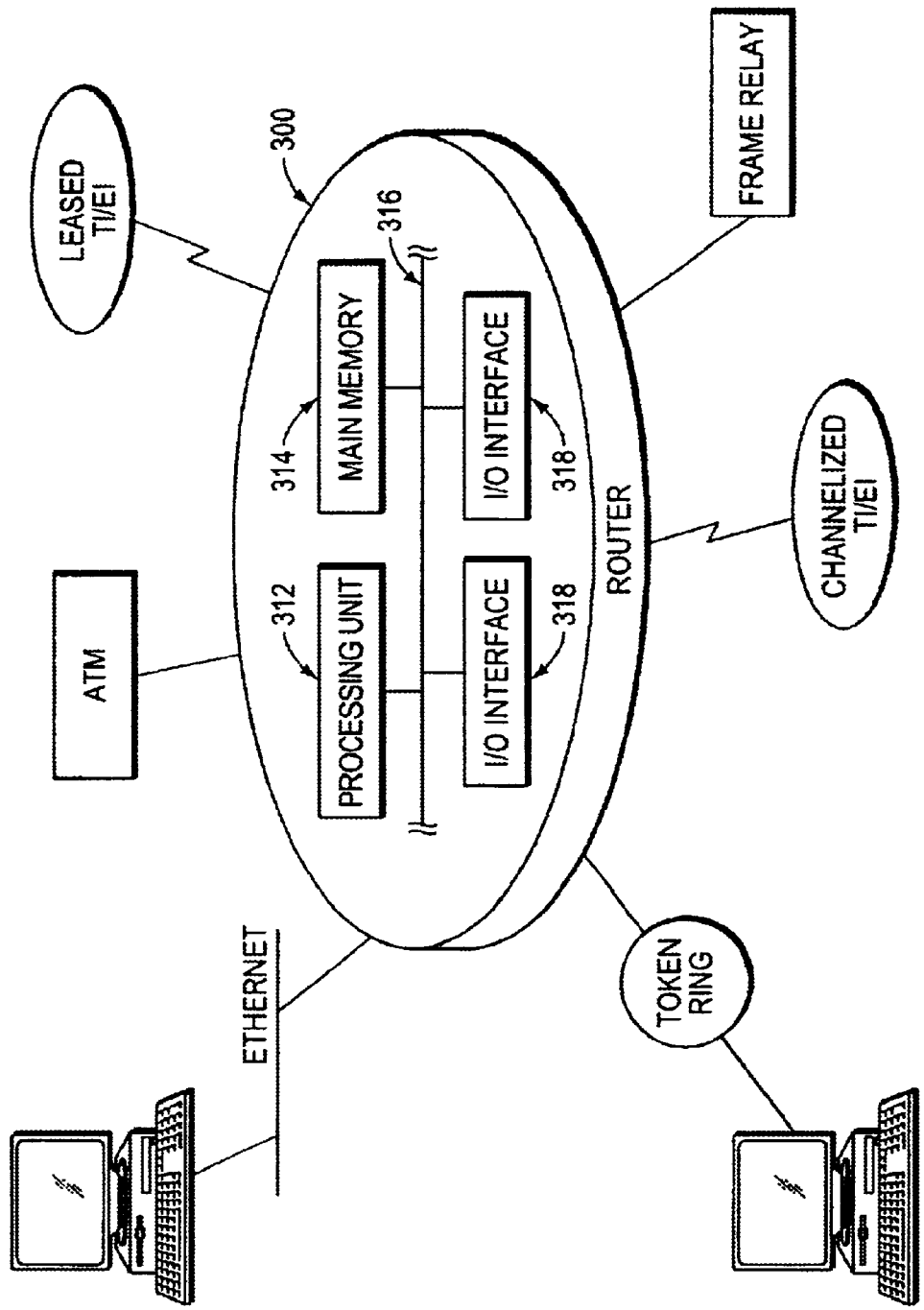
FIG. 3 illustrates a router in which input/output (I/O) interfaces may be implemented in accordance with an embodiment of the invention.

FIG. 3 illustrates a network device 300 such as a router. The router comprises a processing unit 312 and a main memory 314 interconnected by a bus 316. An operating system (OS) resides in the main memory and provides instructions for the processing unit 312 to control the operation of the router. The main memory unit 314 may be a volatile memory such as a Dynamic Random Access Memory (DRAM). A non-volatile memory, such as a Flash memory, may be coupled to the bus 316 to store basic input/output instructions that may be used to configure the various controllers in the router and to maintain status information. Further coupled to the bus may be a plurality of input/output (I/O) interfaces 318 that interact with other routers and devices to transmit and receive information. Some of the I/O interfaces 318 may be in a form of network modules such as WAN interface cards (WICs)/voice interface cards (VICs). The I/O interfaces to allow the router to forward/receive data from various sources such as Token Ring, Asynchronous Transfer Mode (ATM), leased T1/E1 lines, channelized T1/E1, and Frame Relay, among others.

Figure 4:
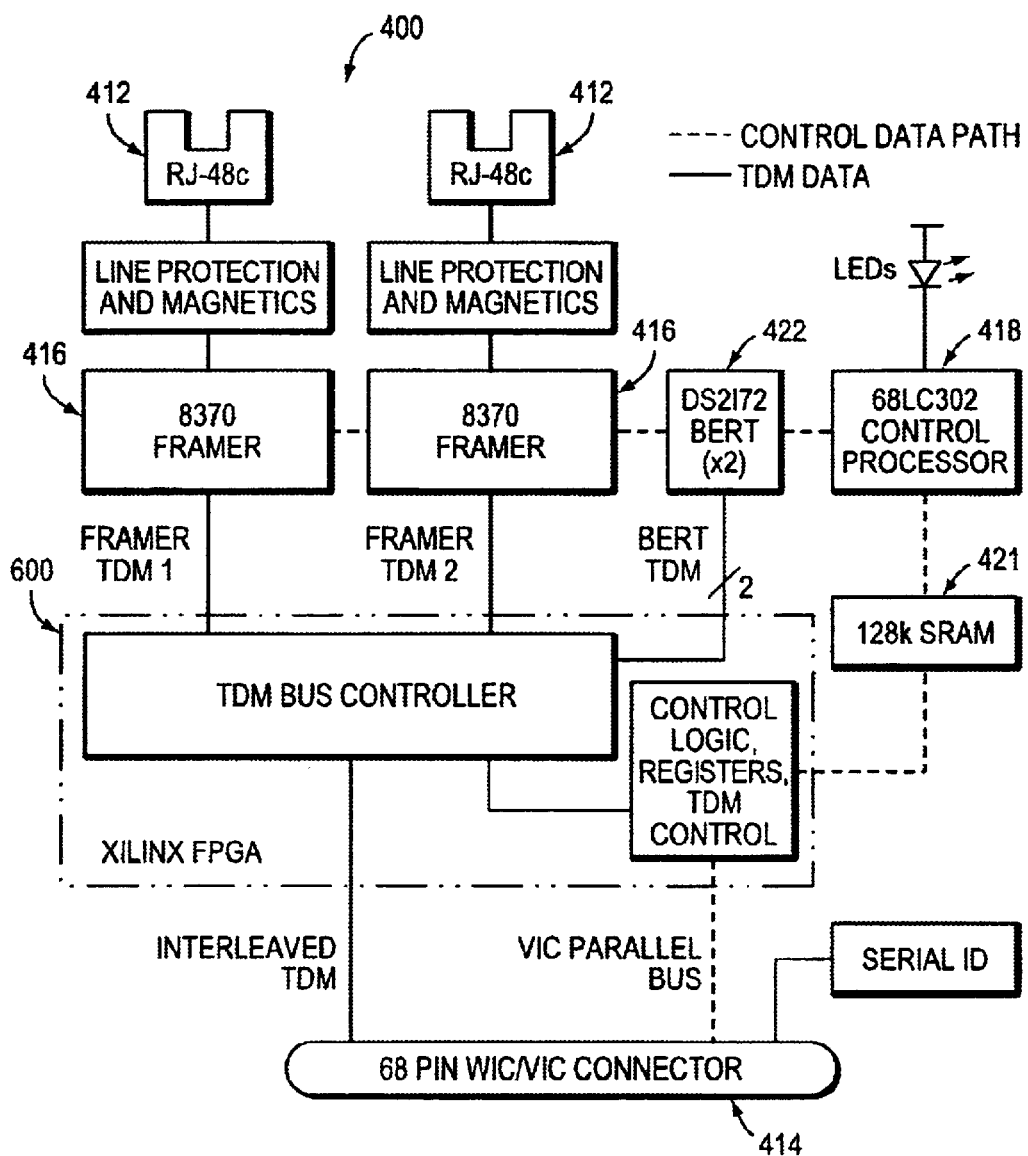
FIG. 4 is a functional block diagram of an I/O interface such as WAN interface card (WIC)/Voice interface card (VIC) in accordance with an embodiment of the invention.

FIG. 4 illustrates a multiport T1/E1 trunk interface in a WIC/VIC interface card 400 in accordance with an embodiment of the invention. The interface card provides integrated data applications on lines provisioned for a combination of T1/E1 and/or another data format such as Frame Relay or ATM data. Its diverse applications include trunk interface for voice/data services, fractional n×64 Kbps service for WANs (frame relay or leased line) or TDM drop and insert (for voice/data integration services). In this embodiment, the WIC/VIC interface card provides two RJ-48C jacks 412 which are standard T1/E1 connection jacks. The interface card further includes a 68 pin WIC/VIC connector 414 that allows it to be coupled to a communications controller such as the MPC860 (see FIG. 5) located in the system motherboard. A Rockwell/Brooktree 8370 T1/E1 Framer with an integrated line interface unit (LIU) (vendor part #Bt8370) 416 in conjunction with a Motorola integrated multiprotocol processor (vendor part #68LC302) 418 having access to 128 K bytes of static memory (SRAM) 421, provide the framing tasks for the card. Specifications and operations of these integrated chips may be found in the corresponding technical documents available from Rockwell and Motorola respectively. A Bit Error Rate Test (BERT) chip available from Dallas Semiconductor (vendor part #DS2171) 422 is used for diagnostic purposes such as line quality and line integrity.

Figure 5:
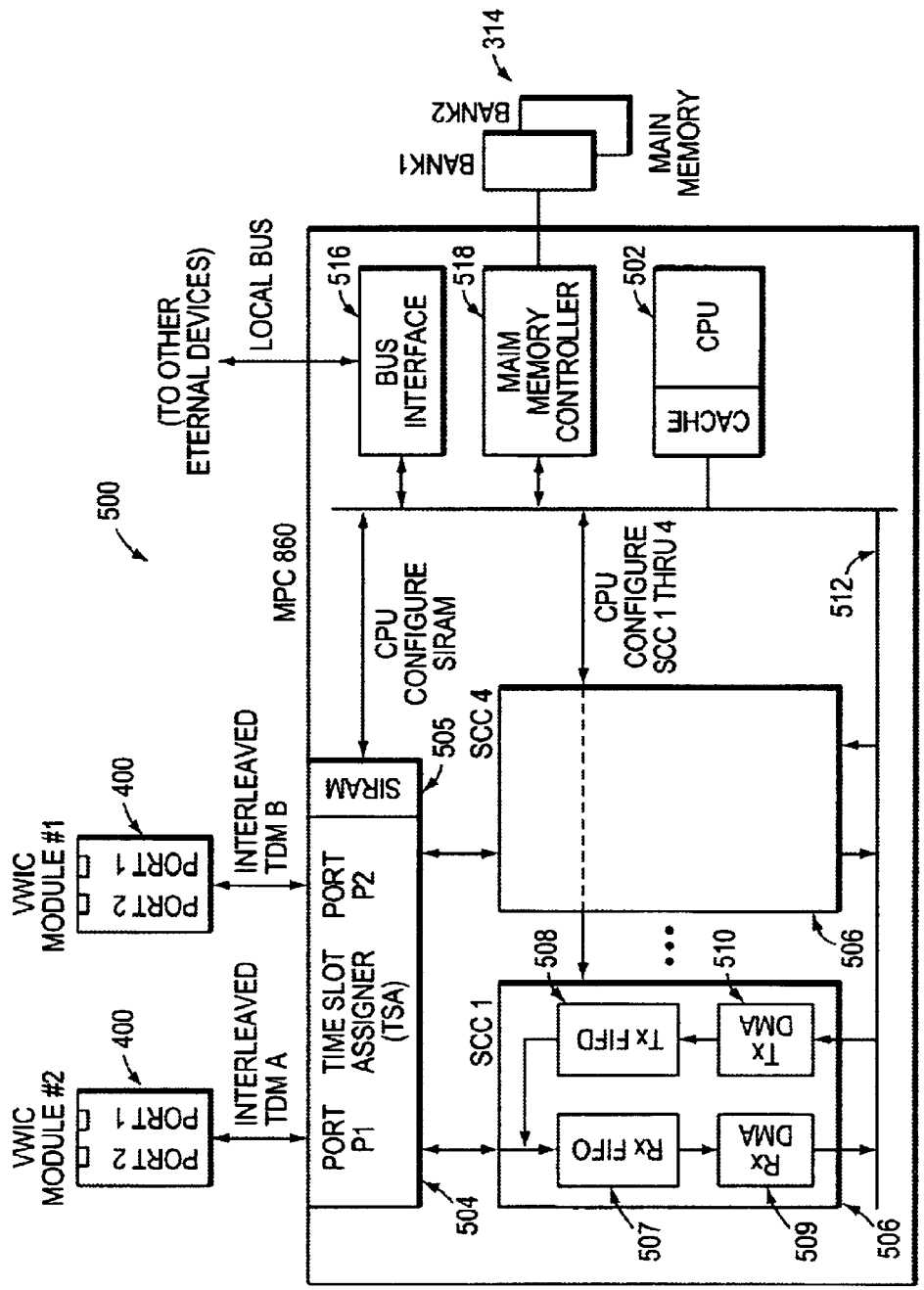
FIG. 5 is a functional block diagram of a communications controller, which in this instance is an MPC860.

FIG. 5 is a schematic diagram of a communications controller 500 such as the MPC860. However, the MPC860 has been merely chosen to aid in the understanding of the invention and does not limit the scope of the invention. For instance, the invention may be implemented using other communication controllers. The MPC860 communication controller comprises a central processing unit (CPU) 502 that is coupled to a Time-Slot Assigner (TSA) 504 and a plurality of Serial Communications Controllers (SCCs) 506 via a local bus 512. The TSA 504 includes 2 serial ports P1, P2 to communicate with 2 WIC/VIC interface cards 400 such as the one shown in FIG. 4. The TSA 504 further includes an Serial Interface Random Access Memory (SI RAM) 505 that holds SCC routing information for the interleaved TDM bits received at the serial ports P1, P2. Each entry in the SI RAM 505 holds routing information for one time slot although the SI RAM may be configured in various ways; for instance, it may be configured to route information at the bit level. Detail configuration information of the SI RAM 505 may be found in the "MPC860 PowerQUICC User's Manual" mentioned above, and in particular in chapter 21.

Each SCC 506 comprises an Receive (Rx) First In First Out (FIFO) buffer 507 and a Transmit (Tx) FIFO buffer 508, which are coupled to the Rx Direct Access Memory controller (DMA) 509 and the Tx DMA 510 respectively. The DMAs, in turn, are coupled to the main memory 314 (see FIG. 3) through the main memory controller (MMU) 514 via the local bus 512. The buffers 507, 508 are bidirectionally coupled to the respective serial port P1 through the TSA 504.

The MPC860 further includes a bus interface 516 that allows it to communicate with external devices. In the illustrative embodiment, MPC860 communicates with a TDM bus controller 600 and, in particular, the clock gapping function block 700 (see FIG. 7) for reasons that will become apparent. According to one embodiment, communication between the CPU 502 and the clock gapping function block is effected via a VIC parallel bus 423 (see FIG. 4). The CPU 502 has the task of configuring the SI RAM 505 and the SCCs 506 in accordance with the interleaved TDM data format received by the TSA.

Figure 6:
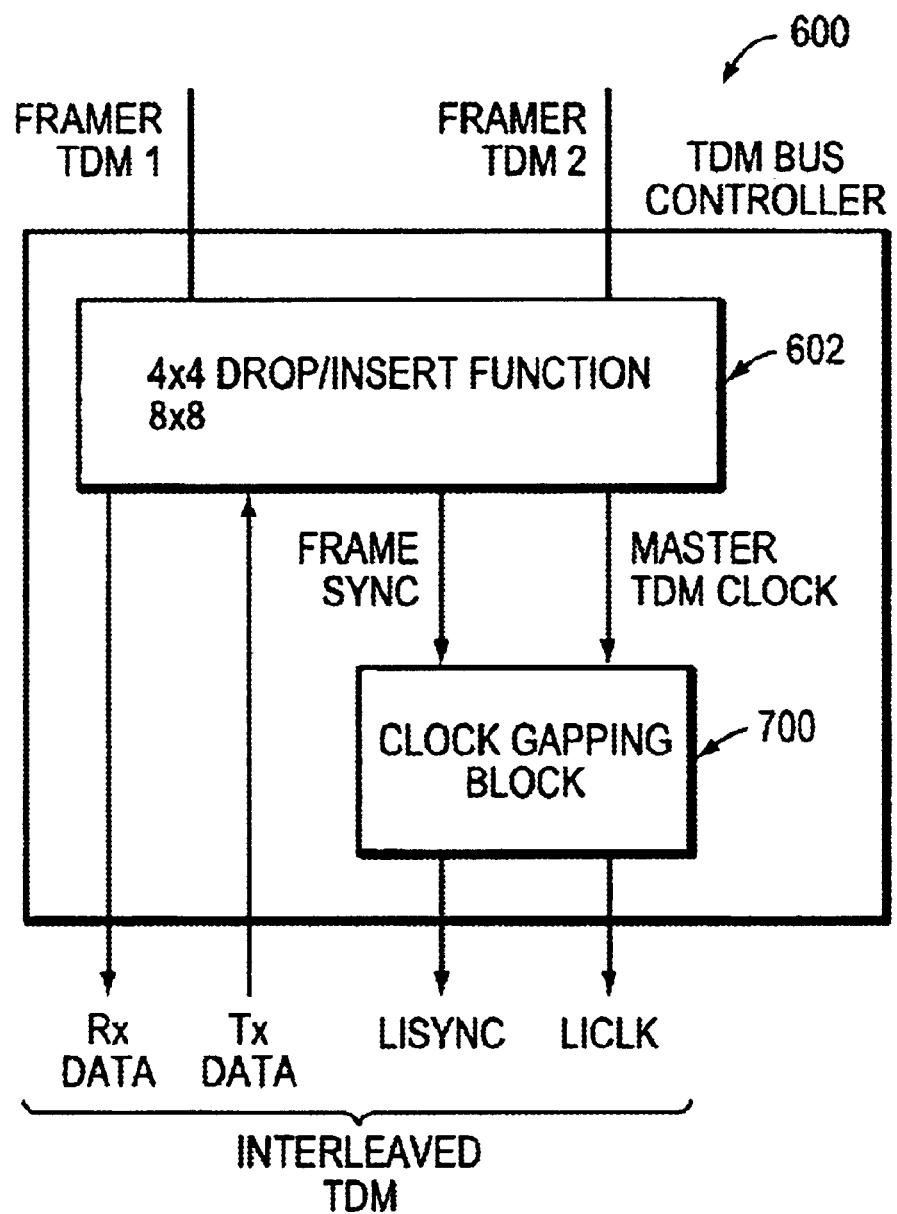
FIG. 6 is a functional block diagram of a TDM bus controller in accordance with an embodiment of the invention.

Referring to FIG. 6, the TDM bus controller 600 transports interleaved TDM data stream and clock signals between the line trunk interface (T1/E1 framed data) and MPC680. In accordance with the invention, a TDM bus controller provides interleaved TDM 1 timeslots and TDM 2 timeslots to form a high port density interleaved TDM data stream at its output. The interleaved TDM format is crafted such that it optimizes the data transfer between the TDM interleaving circuit and the SCC, and will minimize the possibility of an SCC overrun or an underrun. Each serial port has a TSA function that performs "lookup" operations into the SI RAM for routing information and steers the timeslot to the pertinent SCC. Typically, the MPC860 is limited to one high speed WAN link per TSA TDM port due to relatively small receive and transmit buffers at the SCC.

A highly interleaved TDM format allows higher port density and wire speeds on a given TSA port because it is more efficient to have the SCCs operate on a short duty cycle basis than a longer duty cycle basis. The TDM bus controller 600 may be implemented in a Field Programmable Gate Array (FPGA) available from Xilinx (vendor part #XCS30).

Figure 1B:
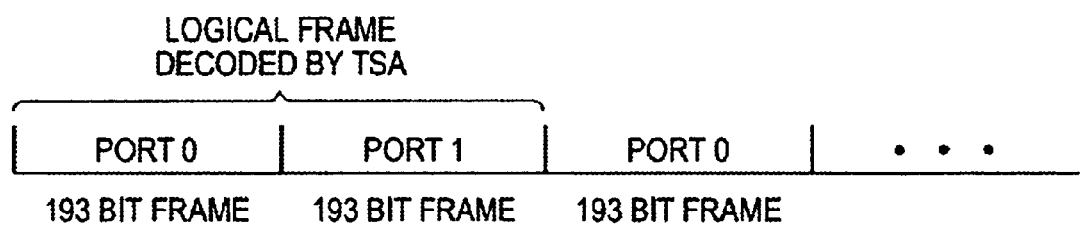
FIG. 1b illustrates interleaving 2 T1 data stream on a per frame basis.
Figure 1C:
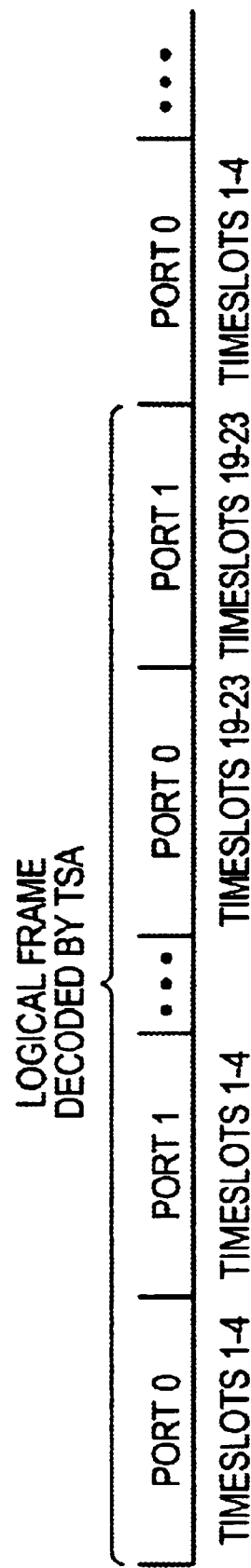
FIG. 1c illustrates interleaving 2 T1 data stream on a per 4 timeslot basis.

FIG. 1b illustrates interleaving 2 T1 data stream on a per frame basis. If interleaving is performed on a per frame basis, the high speed link (for example, two interleaved T1 generate a clock speed of 2×1.544=3.088 Mbps) causes the buffers to overflow/underrun resulting in congestion and reduced performance. Therefore, it is desirable that interleaving be performed on a per timeslot basis. This has the effect of "smoothing out" the data transfer so that the Tx buffers and the Rx buffers are not subjected to a relatively long period of time with a high speed transfer rate, but rather receive and transmit data in smaller bursts that permit the serial DMA to keep pace with TSA port speed. In one embodiment, the TDM bus controller interleaves framer TDM data on either a 4 or 8 time slot basis, using a multiplexer 602. FIG. 1c illustrates interleaving 2 T1 data stream on a per 4 timeslot basis. However, other interleave formats may be used according to a desired result.

The interleaved TDM format comprises a gapped 2× line rate clock L1clk (There is one clock period per TDM bit), Tx/Rx data, and frame sync L1sync. In T1 mode, the clock runs at 3.088 MHz, while in E1 mode it runs at 4.096 MHz. For T1, there can be a maximum of 384 clocks per frame (192 data bits×2); in E1 G.704 (framed) there can be a maximum of 496 (248×2) clocks per frame; and in E1 G.703 (unframed) there can be a maximum of 512 (256×2) clocks per frame. The L1sync pulse always occurs on the Most Significant bit (MSB) of the first provisioned timeslot from either port.

Note that the interleaved TDM format above results in a complex format that needs to be decoded or demultiplexed by the TSA. The decoding capabilities of the TSA is limited, thus, it is desired to simplify the TSA's decoding process. Furthermore, the TDM interleaved format may require more SI RAM entries than are available. In accordance with an embodiment of the invention, the solution is to gap the clock L1 clk for all timeslots that are not provisioned, as well as LSBs that are merely used for signaling. In the case of T1, the frame bit ($193^{rd}$) of each frame is also gapped. The clock gapping may be configured on a per port basis. The gapped clock is used by the TSA as a timing sequence to determine when to access the entries in the SI RAM.

The CPU 502 configures the clock gapping function block 700 and the SI RAM 505 so that the TDM bus controller 600 and the TSA 504 of the MPC860 operate synchronously. In particular, the MPC860 is able to determine whether the TDM bus controller is programmed initially or dynamically to operate in 4×4 mode or the 8×8 mode (although other interleaving formats may be used). From the framer 416 or other sources (such as network device administrator input), the MPC 860 is able to determine whether it is a 56 Kbit service (corresponding to T1 carrier) or a 64 Kbit service (corresponding to is E1 carrier). The MPC 860 also determines which timeslot is (or is not) provisioned. For instance, the incoming T1 carrier may be a fractional service using less than the available 24 timeslots. Using the above information, the MPC860 programs the SI RAM 505 so that routing information is stored to steer the timeslots to the respective SCCs. Regarding the TDM bus controller 600, the MPC860 programs a dual port lookup memory located at the clock gapping block 700 so that the interleaved TDM data is appropriately clock gapped as discussed below.

Figure 7:
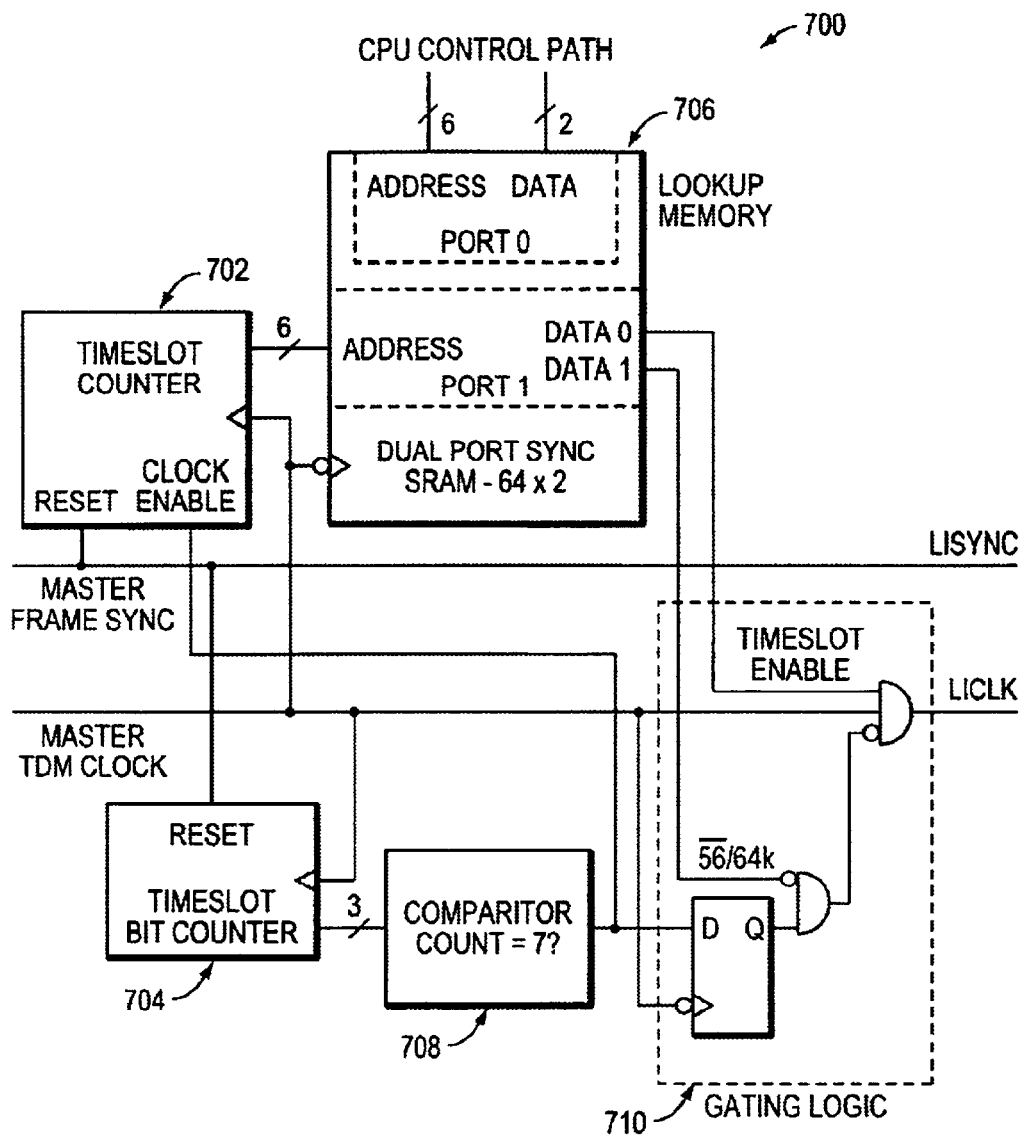
FIG. 7 is a detailed functional diagram of a clock gapping block in accordance with an embodiment of the invention.

Referring to FIG. 7, the clock gapping function block 700 is provided to remove clock pulses from the TDM bus in response to programming by the communications controller (MPC860) 500.

The Timeslot Counter 702 indicates which timeslot is currently active on the TDM bus. The TDM bus transports 2 T1 or E1 connections in an effective data rate of 4.096 Mbits/second, which requires 64 timeslots per 125 uSecond period. The timeslot count values are 0 to 63. The Master Frame Sync denotes the beginning of each frame. The Master Frame Sync resets the count to 0 on every occurrence (i.e. at the beginning of every frame). The counter increments when the bit counter indicates the LSB is active (count=7); that is, the last bit in the timeslot is active and the next timeslot MSB.

The Bit Counter 704 indicates which bit in the timeslot is currently active. Each timeslot has 8 bits, so the count values are 0 to 7. The Master Frame Sync pulse resets the counter to 2 so that the actual count <timeslot:bit> "leads" the true count by 1 bit. Having the count lead by 1 provides sufficient time to lookup the configuration in the Lookup Memory 706.

The Lookup Memory 706 specifies whether a particular timeslot is provisioned, and if it is 56 kbit or 64 kbit service. The memory to be used as a lookup memory should be dual ported. One port is used by the MPC860 to configure the lookup memory so that its entries corresponds to the SI RAM entries. The other port is used by the clock gapping function block 700 for the real-time lookup. The Timeslot Counter is used for the real-time lookup. The memory is organized as 64 entries (one for each timeslot) by 2 bits. This count value is used as the lookup address. The resulting data indicates whether the timeslot is enabled for communication (0=disabled, 1=enabled), and whether it is 56 kbit or 64 kbit service (0=56 k service, 1=64 k service).

The Comparitor 708 is a boolean AND function configured to logically AND each of the 3 bits from the timeslot bit counter. If the output is true, then the least significant (LSB) is active in the timeslot.

The Gating Logic 710 uses the information from the Lookup Memory to gate (turn off) the Master TDM Clock. The result is the L1CLK master clock to the MPC860. The operation is as follows: If the timeslot is enabled as indicated by the Lookup Memory (data 0), then the clock propagates. If it is disabled, then it is gated off. An additional step is required for 56 kbit service. If the timeslot is enabled, then it is further qualified with the Bit Count Comparitor—AND—the 56 kbit parameter (Lookup Memory Data 1). If the Bit Count Comparitor indicates the last bit of the timeslot is active, then this clock must not propagate if it is 56 kbit service.

An interface that optimizes TDM format for multiple high speed links to a communication controller has been described. It will however be apparent that other variations and modifications may be made to the described embodiments, with the attainment of some or all of their advantages. Therefore, it is the object of the appended claims to cover all such variations and modifications that come within the true spirit and scope of the invention.

What is claimed is:

1. An apparatus to optimize an interleaved Time Division Multiplexing (TDM) format for multiple high speed TDM links to a communications controller, the apparatus comprising:

a clock gapping block that receives clocks corresponding to an interleaved TDM data stream and that gaps the clocks corresponding to portions of the interleaved TDM data stream that are not provisioned;

a Time Slot Assigner (TSA) that receives the gapped clocks from the clock gapping function and the interleaved TDM data stream; and a memory coupled to the TSA, the memory having entries that contain routing information of the interleaved TDM data stream in which the entries are entered in anticipation of the gapped clock, wherein the TSA steers the interleaved TDM data stream responsive to the entries of the memory and the gapped clock.

2. The apparatus as in claim 1, further comprising:

a multiplexer that interleaves multiple high speed TDM links into the interleaved TDM data stream in accordance with a predetermined interleaved TDM data stream format.

3. The apparatus as in claim 1, further comprising:

a processor that programs the clock gapping function block to gap clocks of portions of the interleaved TDM data stream that are not provisioned and the processor that further programs the memory with entries in anticipation of the gapped clock.

4. The apparatus as in claim 3, wherein the clock gapping function block further includes a lookup memory, the processor enters entries in the lookup memory which is used by the clock gapping function block to gap the clocks corresponding to the portion of the TDM data stream that are not provisioned.

5. The apparatus as in claim 4, wherein the lookup memory is a dual port memory so that the processor enters entries into the lookup memory independent of an operation of the clock gapping function block.

6. The apparatus as in claim 1, wherein the clock gapping function block that gaps clocks of portions of the interleaved TDM data stream that are not provisioned includes gapping clocks that correspond to signaling information.

7. The apparatus as in claim 1, wherein the clock gapping function block that gaps clocks of portions of the interleaved TDM data stream that are not provisioned includes gapping clocks that correspond to framing information.

8. An apparatus to optimize an interleaved Time Division Multiplexing (TDM) format for multiple high speed TDM links to a communications controller, the apparatus comprising:

means for receiving clocks corresponding to a interleaved TDM data stream and to gap the clocks corresponding to portions of the interleaved TDM data stream that are not provisioned;

means for receiving the gapped clocks from the clock gapping function block and the interleaved TDM data stream; and a memory coupled to the means for receiving, wherein the memory has entries that contain routing information of the interleaved TDM data stream in which the entries are entered in anticipation of the gapped clock, and wherein the TSA steers the interleaved TDM data stream responsive to the entries of the memory and the gapped clock;

means for programming the clock gapping function block to gap clocks of portions of the interleaved TDM data stream that are not provisioned; and means for programming the memory with entries in anticipation of the gapped clock.

9. A method for optimizing an interleaved Time Division Multiplexing (TDM) format for multiple high speed TDM links to a communications controller, the method comprising the steps of:

receiving clocks corresponding to an interleaved TDM data stream;

gapping clocks corresponding to portions of the interleaved TDM data stream that are not provisioned;

sending the gapped clocks to a Time Slot Assigner (TSA) along with the interleaved TDM data stream; and steering the interleaved TDM data stream to appropriate destinations in response to entries that contain routing information of the interleaved TDM data stream, the entries which have been entered in anticipation of the gapped clock.

10. The method as in claim 9, further comprising the step of:

gapping clocks that correspond to signaling information.

11. The method as in claim 9, further comprising the step of:

gapping gaps clocks that correspond to framing information.

12. A method for optimizing an interleaved Time Division Multiplexing (TDM) format for multiple high speed TDM links to a communications controller, the method comprising the steps of:

providing a clock gapping function block that receives clocks corresponding to an interleaved TDM data stream and to gap the clocks corresponding to portions of the interleaved TDM data stream that are not provisioned;

sending the gapped clocks to a Time Slot Assigner (TSA) along with the interleaved TDM data stream; and steering the interleaved TDM data stream to appropriate destinations by the TSA in response to entries in a memory that contain routing information of the interleaved TDM data stream, the entries which have been entered in anticipation of the gapped clock.

13. The method as in claim 12, further comprising the step of:

providing a multiplexer that interleaves multiple high speed TDM links in accordance with a predetermined interleaved TDM data stream format.

14. The method as in claim 12, further comprising the steps of:

programming the clock gapping function block to gap clocks of portions of the interleaved TDM data stream that are not provisioned; and programming the memory with entries in anticipation of the gapped clock.

15. The method as in claim 14 further comprising the step of:

providing a lookup memory in the clock gapping function block, wherein the programming of the clock gapping function block includes, entering entries in the lookup memory which are used by the clock gapping function block to gap the clocks corresponding to the portion of the TDM data stream that are not provisioned.

16. The method as in claim 15, wherein the lookup memory is a dual port memory, the method further comprising the step of:

entering entries into the lookup memory independent of an operation of the clock gapping function block.

17. The method as in claim 12, further comprising the step of:

gapping clocks that correspond to signaling information.

18. The method as in claim 12, further comprising the step of:

gapping gaps clocks that correspond to framing information.

19. A computer readable media, comprising:

said computer readable media having instructions written thereon for execution on a processor for, receiving clocks corresponding to an interleaved TDM data stream;

gapping clocks corresponding to portions of the interleaved TDM data stream that are not provisioned;

sending the gapped clocks to a Time Slot Assigner (TSA) along with the interleaved TDM data stream; and steering the interleaved TDM data stream to appropriate destinations in response to entries that contain routing information of the interleaved TDM data stream, the entries which have been entered in anticipation of the gapped clock.

20. A computer readable media, comprising:

said computer readable media having instructions written thereon for execution on a processor for, providing a clock gapping function block that receives clocks corresponding to an interleaved TDM data stream and to gap the clocks corresponding to portions of the interleaved TDM data stream that are not provisioned;

sending the gapped clocks to a Time Slot Assigner (TSA) along with the interleaved TDM data stream; and steering the interleaved TDM data stream to appropriate destinations by the TSA in response to entries in a memory that contain routing information of the interleaved TDM data stream, the entries which have been entered in anticipation of the gapped clock.

21. Electromagnetic signals propagating on a computer network comprising:

said electromagnetic signals carrying instructions for execution on a processor for, receiving clocks corresponding to an interleaved TDM data stream;

gapping clocks corresponding to portions of the interleaved TDM data stream that are not provisioned;

sending the gapped clocks to a Time Slot Assigner (TSA) along with the interleaved TDM data stream; and steering the interleaved TDM data stream to appropriate destinations in response to entries that contain routing information of the interleaved TDM data stream, the entries which have been entered in anticipation of the gapped clock.

22. Electromagnetic signals propagating on a computer network comprising:

said electromagnetic signals carrying instructions for execution on a processor for, providing a clock gapping function block that receives clocks corresponding to an interleaved TDM data stream and to gap the clocks corresponding to portions of the interleaved TDM data stream that are not provisioned;

sending the gapped clocks to a Time Slot Assigner (TSA) along with the interleaved TDM data stream; and steering the interleaved TDM data stream to appropriate destinations by the TSA in response to entries in a memory that contain routing information of the interleaved TDM data stream, the entries which have been entered in anticipation of the gapped clock.

23. An apparatus to optimize processing of an interleaved Time Division Multiplexed (TDM) data stream comprising:

a lookup memory that contains entries corresponding to portions of an interleaved TDM data stream are to be omitted from processing;

a clock gapping block that receives a clock signal related to the interleaved TDM data stream and removes one or more clock pulses from the clock signal in response to the data in the lookup memory, to create a gapped clock signal with gaps corresponding to portions of the interleaved TDM data stream that are to be omitted from processing;

a memory having entries that contain routing information for the interleaved TDM data stream, the entries entered in anticipation of the gapped clock signal; and a Time Slot Assigner (TSA) that steers the interleaved TDM data stream in response to the entries in the memory and in response to the gapped clock signal.

24. The apparatus as in claim 23, further comprising:

a multiplexer that interleaves multiple TDM links into the interleaved TDM data stream in accordance with a predetermined interleaved TDM data stream format.

25. The apparatus as in claim 23, further comprising:

a processor that controls the operation of the clock gapping block and further programs the memory with entries in anticipation of the gapped clock.

26. The apparatus as in claim 25, in which the lookup memory comprises:

a dual ported memory that has a first port connected to the processor and a second port connected to the clock gapping block.

27. The apparatus as in claim 23, wherein the clock gapping block further comprises:

circuitry for removing one or more clock pulses from the clock signal, in response to the data in the lookup memory, for portions of the interleaved TDM data stream that are not provisioned.

28. The apparatus as in claim 23, wherein the clock gapping block further comprises:

circuitry for removing one or more clock pulses from the clock signal, in response to the data in the lookup memory, for portions of the interleaved TDM data stream that correspond to signaling information.

29. The apparatus as in claim 23, wherein the clock gapping block further comprises:

circuitry for removing one or more clock pulses from the clock signal, in response to the data in the lookup memory, for portions of the interleaved TDM data stream that correspond to framing information.

30. A method for optimizing processing of an interleaved Time Division Multiplexed (TDM) data stream comprising:

storing entries in a lookup memory corresponding to portions of an interleaved TDM data stream that are to be omitted from processing;

removing one or more clock pulses from a clock signal in response to the data in the lookup memory, to create a gapped clock signal with gaps corresponding to portions of the interleaved TDM data stream that are to be omitted from processing;

storing routing information for the interleaved TDM data stream in anticipation of the gapped clock signal; and steering the interleaved TDM data stream in response to the entries in the routing information and in response to the gapped clock signal.

31. The method of claim 30, further comprising:

interleaving multiple TDM links into the interleaved TDM data stream in accordance with a predetermined interleaved TDM data stream format.

32. The method of claim 30, further comprising:

providing a processor that controls removing clock pulses from the clock signal and that directs storing routing information for the interleaved TDM data stream in anticipation of the gapped clock signal.

33. The method of claim 32, further comprising:

providing the lookup memory to be a dual ported memory.

34. The method of claim 32, further comprising:

removing one or more clock pulses, in response to the data in the lookup memory, for portions of the interleaved TDM data stream that are not provisioned.

35. The method of claim 32, further comprising:

removing one or more clock pulses, in response to the data in the lookup memory, for portions of the interleaved TDM that correspond to signaling information.

36. The method of claim 32, further comprising:

removing one or more clock pulses, in response to the data in the lookup memory, for portions of the interleaved TDM signal that correspond to framing information.

37. An apparatus to optimize processing of an interleaved Time Division Multiplexed (TDM) data stream comprising:

means for storing entries in a lookup memory corresponding to portions of an interleaved TDM data stream that are not provisioned;

means for removing one or more clock pulses from a clock signal in response to the data in the lookup memory, to create a gapped clock signal with gaps corresponding to portions of the interleaved TDM data stream that are not provisioned;

means for storing routing information for the interleaved TDM data stream in anticipation of the gapped clock signal; and means for steering the interleaved TDM data stream in response to the entries in the routing information and in response to the gapped clock signal.

38. A computer readable media, comprising:

said computer readable media having instructions written thereon for execution on a processor for, storing entries in a lookup memory corresponding to portions of an interleaved TDM data stream that are to be omitted from processing;

removing one or more clock pulses from a clock signal in response to the data in the lookup memory, to create a gapped clock signal with gaps corresponding to portions of the interleaved TDM data stream that are to be omitted from processing;

storing routing information for the interleaved TDM data stream in anticipation of the gapped clock signal; and steering the interleaved TDM data stream in response to the entries in the routing information and in response to the gapped clock signal.

39. Electromagnetic signals propagating on a computer network comprising:

said electromagnetic signals carrying instructions for execution on a processor for, storing entries in a lookup memory corresponding to portions of an interleaved TDM data stream that are to be omitted from processing;

removing one or more clock pulses from a clock signal in response to the data in the lookup memory, to create a gapped clock signal with gaps corresponding to portions of the interleaved TDM data stream that are to be omitted from processing;

storing routing information for the interleaved TDM data stream in anticipation of the gapped clock signal; and steering the interleaved TDM data stream in response to the entries in the routing information and in response to the gapped clock signal.

* * * * *